US012768374B2

(12) United States Patent
Kretzer et al.

(10) Patent No.: US 12,768,374 B2
(45) Date of Patent: Oct. 20, 2026

(54) HYDRAULIC CYLINDER ASSEMBLY AND METHOD FOR OPERATING A HYDRAULIC CYLINDER ASSEMBLY

(71) Applicant: Robert Bosch GmbH, Stuttgart (DE)

(72) Inventors: Simon Kretzer, Eussenheim (DE); Rebecca Lacour, Rothenbuch (DE); Stephan Becker, Haibach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 19/183,824

(22) Filed: Apr. 19, 2025

(65) Prior Publication Data

US 2025/0327467 A1 Oct. 23, 2025

(30) Foreign Application Priority Data

Apr. 22, 2024 (DE) ..................... 10 2024 203 717.6

(51) Int. Cl.
*F15B 20/00* (2006.01)
*F15B 13/044* (2006.01)

(52) U.S. Cl.
CPC .......... *F15B 20/002* (2013.01); *F15B 13/044* (2013.01); *F15B 2211/862* (2013.01); *F15B 2211/8623* (2013.01); *F15B 2211/8626* (2013.01); *F15B 2211/8752* (2013.01)

(58) Field of Classification Search
CPC .............. F15B 20/002; F15B 2211/862; F15B 2211/8623; F15B 2211/8752
See application file for complete search history.

(56) References Cited

U.S. PATENT DOCUMENTS

2008/0236156 A1* 10/2008 Kakino .................. F15B 15/18 60/443
2010/0300084 A1* 12/2010 Sturmer ................ F04B 49/002 60/406

(Continued)

FOREIGN PATENT DOCUMENTS

DE 10 2006 058 630 B4 12/2012
DE 10 2012 106 031 B3 7/2013

(Continued)

OTHER PUBLICATIONS

DE 102012106031 B3 machine translation (Year: 2013).*

*Primary Examiner* — Matthew Wiblin
(74) *Attorney, Agent, or Firm* — Maginot, Moore & Beck LLP

(57) ABSTRACT

A hydraulic cylinder assembly includes a hydraulic cylinder, a motor for driving an adjustable pump, the pump, and a pivot angle control system for the pump. The pivot angle control system has at least one adjustment piston for adjusting the pump and an electrically controllable valve for controlling the adjustment piston. At least one conveying direction of the pump and thus a movement of the hydraulic cylinder is controllable via the pivot angle control system. The hydraulic cylinder assembly further includes an electrical control unit for operating at least the motor and the valve and an uninterruptible power supply, configured such that, in the event of a failure of a power supply for the control unit, at least the control unit can be supplied with electrical power from the uninterruptible power supply.

6 Claims, 4 Drawing Sheets

(56) References Cited

U.S. PATENT DOCUMENTS

| | | | | |
|---|---|---|---|---|
| 2011/0138799 | A1* | 6/2011 | Wagner | F04B 49/002 60/445 |
| 2013/0014499 | A1* | 1/2013 | Gray, Jr. | F15B 20/004 60/420 |
| 2014/0026969 | A1* | 1/2014 | Helbig | F03D 7/04 137/487.5 |
| 2014/0311139 | A1* | 10/2014 | Lasaar | F16H 61/4192 60/446 |
| 2018/0155044 | A1* | 6/2018 | Halsey | B64C 25/22 |
| 2023/0120042 | A1* | 4/2023 | Turner | B65F 3/02 381/71.1 |

FOREIGN PATENT DOCUMENTS

| | | | |
|---|---|---|---|
| DE | 10 2019 213 732 | A1 | 3/2021 |
| EP | 2 657 539 | B1 | 4/2020 |

* cited by examiner

HYDRAULIC CYLINDER ASSEMBLY AND METHOD FOR OPERATING A HYDRAULIC CYLINDER ASSEMBLY

This application claims priority under 35 U.S.C. § 119 to application no. DE 10 2024 203 717.6, filed on Apr. 22, 2024 in Germany, the disclosure of which is incorporated herein by reference in its entirety.

The disclosure relates to a hydraulic cylinder assembly and a method for operating a hydraulic cylinder assembly. In particular, a hydraulic cylinder is adjustable between at least two (extreme) positions. In doing so, a piston is displaced within the cylinder. To displace the piston, a hydraulic medium is supplied to the cylinder. The medium is conveyed by a pump. The pump can be, for example, driven by an electric motor. To move the piston back and forth, the cylinder can comprise, for example, two chambers, which are capable of being exposed to the medium as a function of the desired position of the piston.

BACKGROUND

It is known that in hydraulic cylinder assemblies, e.g. after a shutdown of the hydraulic cylinder assembly, a (residual) movement of the piston can be prevented. For this purpose, for example, shut-off valves can be provided, through which a hydraulic connection between a chamber or chambers of the cylinder and the pump is interrupted. The motor provided to drive the pump is shifted in particular free of torque.

The shift to a torque-free state (i.e. in which the motor does not provide torque for driving or decelerating) is referred to as "safe-torque-off" (STO).

Such a shutdown of the hydraulic cylinder assembly can be triggered by various events:

- an emergency stop of the hydraulic cylinder assembly is actuated;
- there is a fault in the system, or one is detected;
- power failure.

If, for example, no shut-off valves are provided, the piston continues to move as the medium is conveyed by the pump. A simple triggering of an STO on the motor will only result in a stoppage of the pump in particular when the kinetic energy of the motor and the pump is dissipated (provided no external hydraulic forces are acting on the pump). The pump conveys according to its direction of rotation and, if applicable, its pivot angle.

Hydraulic cylinder assemblies with a pivot angle control system are also known. The hydraulic cylinder assembly then comprises a hydraulic cylinder (with a piston), a motor for driving an adjustable pump, the pump, and a pivot angle control system for the pump, wherein the pivot angle control system comprises at least one adjustment piston for pump displacement and an electrically controllable valve for controlling the adjustment piston. At least one direction of conveyance of the pump and thus a movement of the hydraulic cylinder or the piston is controllable via the pivot angle control system. The pump is adjustable through the pivot control system between −100% (maximum discharge rate of the pump in a first direction), 0% (no delivery of a medium through the pump), and +100% (maximum discharge rate of the pump in a second direction).

If the (pivot angle control) valve is switched to its de-energized default position analogously to the STO of the motor, then the resulting pivot angle of the pump, and thus whether and in which direction the pump conveys, depends on the default position of the valve, the valve pressure supply, and the presence of springs in the pivot cradle.

In a so-called A4 HS5 pump with connected control pressure and de-energized proportional valve or HS5 control valve (as the valve), for example, the minimum displacement of the pump is the default position. This default position is also achieved when the HS5 control valve is de-energized due to a fault (e.g. cable break, etc.). By contrast to an open circuit in which the pump pivots to a minimum limit stop (zero % discharge), the pump pivots beyond the zero position in the closed circuit to −100% discharge (direction reversal). In this case, the consumer connected to the pump, e.g. a hydraulic cylinder or hydraulic motor), accelerates in a maximum direction of movement. By implementing a zero-pivot function into the known HS5(E) control system, this behavior can be prevented.

In order to enable the pump to be pivoted to zero % with a de-energized pivot angle control valve in case of, for example, pumps with this kind of unfavorable default position of the pivot angle control valve, an additional (second) valve and an additional (second) piston or cylinder can be provided.

In normal operation of the hydraulic cylinder assembly, the electrically actuated 4/4-way valve controls the pressure ratios in the adjustment piston as the (first) valve and thus pivots the pump. The first valve is thus loaded with current and unloads the second piston, which is thus ineffective/powerless. In the event of a fault of the (first) valve, the valve moves to a default position in which the one (first) chamber of the adjustment piston is connected to the return flow and is thus unloaded. The other (second) adjustment piston chamber is connected to the adjustment pressure. This causes the adjustment piston to be moved towards the first chamber. In order to prevent the end position of the adjustment piston (in which a maximum conveying quantity of the pump is set), the second valve is deactivated and connects the second piston or cylinder with the adjustment pressure. As a result, the second piston extends to an adjustable limit stop (which corresponds to the center position, i.e. the zero % position of the pump). The effective surface of the second piston is larger than the effective surface of the adjustment piston, so that it is ensured that the end position of the second piston or cylinder is achieved, which in turn corresponds to the center position, i.e. the zero % position of the pump.

However, the second piston and second valve are required in order to implement this hydraulic cylinder assembly.

In light of the foregoing, the problem addressed by the disclosure is to at least partially alleviate the situation described with reference to the prior art, and in particular to provide a more cost-efficient solution for a hydraulic cylinder assembly, with which an orderly, rapid stop of the hydraulic cylinder is achievable.

SUMMARY

This problem is solved by the subject-matter disclosed herein. The features specified in the disclosure can be combined with one another in any technologically meaningful way. The description, in particular in connection with the figures, explains the disclosed hydraulic cylinder assembly and specifies further design variants.

A hydraulic cylinder assembly contributes to this, comprising at least a hydraulic cylinder, a motor for driving an adjustable pump, the pump, and a pivot angle control system for the pump, wherein the pivot angle control system comprises at least one adjustment piston for pump displacement and an electrically controllable valve for controlling the adjustment piston. At least one direction of conveyance of the pump (in particular between −100% and +100% conveying quantity) and thus a movement of the hydraulic cylinder is controllable via the pivot angle control system. The hydraulic cylinder assembly comprises an electrical control unit for operating at least the motor and the valve.

The hydraulic cylinder assembly (further) comprises an uninterruptible power supply, such that in the event of a failure of a power supply for the control unit, at least the control unit can be supplied with electrical power from the uninterruptible power supply.

In particular in the event of a failure of the power supply for the control unit, at least the valve can be controlled via the power supplied by the uninterruptible power supply so that a pivot angle of the pump can be adjusted to zero % via the adjustment piston.

In particular, in the event of a failure of the power supply for the control unit, at least the motor can also be decelerated to zero rpm via the energy supplied by the uninterruptible power supply, in particular through a decelerating resistor.

In particular, the uninterruptible power supply comprises a capacitor or a DC link connected to the power supply, wherein the capacitor or the DC link provides the power for supplying at least the control unit in the event of a failure of the power supply.

The capacitor or DC link is specifically dimensioned such that sufficient electrical energy is or can be stored in it. “Sufficiently” here specifically means that at least the motor can be decelerated to zero rpm [revolutions per minute] and/or the valve can be actuated long enough so that the pivot angle of the pump is adjusted to zero % via the adjustment piston.

A DC link is a generally known electrical device which, as an energy store, electrically couples multiple electrical grids at an intermediate current or voltage level, e.g. via an inverter. A capacitor is also generally known as an energy store.

In particular, uninterruptible power supplies designed as modules are also known.

In particular, it can be ensured that the uninterruptible power supply can thus ensure that the hydraulic cylinder reaches a stop (the pump no longer conveys or is in the zero % position and/or the motor no longer drives the pump).

A method for operating a hydraulic cylinder assembly, in particular for operating the described hydraulic cylinder assembly, is further proposed. The hydraulic cylinder assembly comprises at least a hydraulic cylinder, a motor for driving an adjustable pump, the pump, and a pivot angle control system for the pump, wherein the pivot angle control system comprises at least one adjustment piston for pump displacement and an electrically controllable valve for controlling the adjustment piston. At least one direction of conveyance of the pump and thus a movement of the hydraulic cylinder is controllable via the pivot angle control system. The hydraulic cylinder assembly comprises an electrical control unit for operating at least the motor and the valve and an uninterruptible power supply (UPS). For the event of failure of a power supply, the method comprises at least the following steps:

a) supplying electrical power to at least the control unit from the uninterruptible power supply; and (thereby) at least
b) decelerating the motor to zero rpm using energy supplied by the uninterruptible power supply, or actuating the valve using energy supplied by the uninterruptible power supply, so that a pivot angle of the pump is adjusted to zero % via the adjustment piston.

Steps a) and b) are in particular carried out together, i.e. (only) the electrical energy of the uninterruptible power supply causes the motor to decelerate (e.g. through a decelerating resistor, which may be electrically actuated and mechanically actuated or exclusively electrically actuated) and/or the valve to be driven.

Without the actuation of the valve, it would otherwise in particular move to a default position as shown, in which the adjustment piston is transferred to one of the end positions, so that the pump would then be adjusted to −100% or +100% pivot angle and the hydraulic cylinder would continue to move.

In particular, step b) fully consumes the energy supplied by the uninterruptible power supply. In particular, after step b), the hydraulic cylinder assembly is de-energized, that is, there is then no electrical energy left in the hydraulic cylinder assembly (i.e. in the control unit, the uninterruptible power supply, or other components).

The control unit is in particular a data processing system comprising means that are suitably equipped, configured, or programmed to carry out the method. In particular, the control unit is supplied with electrical power from the power supply outside of a fault event. For the event that the power supply fails or is interrupted (e.g. by an emergency stop switch), the present method provides that electrical power is supplied to the control unit via the uninterruptible power supply. The uninterruptible power supply is then used in order to initiate motor decelerating and/or actuating of the valve as described.

The means comprise, for example, a processor and a memory in which instructions to be executed by the processor are stored, as well as data lines or transmission means that allow a transmission of instructions, measured values, data, or the like between the listed elements.

The “means” can in particular comprise one or more of the following components: control(s), microcontrollers, data memory, data connection, display devices (such as a display), counters or timers, at least one further sensor, a power source (the uninterruptible power supply, which can be integrated with the control unit or can be arranged separately therefrom), etc.

A computer program is proposed, which comprises commands which, when the computer program is executed by a computer, cause the computer program to execute the described method or the steps of the described method.

A computer-readable storage medium is further proposed, comprising instructions which, when executed by a computer, cause the computer to carry out the described method or steps of the described method.

The statements regarding the method are in particular transferable to the hydraulic cylinder unit, the system for data processing, and/or the computer-implemented method (i.e. the computer program and the computer-readable storage medium) and vice versa.

The described hydraulic cylinder assembly or method allows the hydraulic cylinder unit to be moved into an orderly stop of the hydraulic cylinder within a short time (if no external forces are moving it), in particular despite the presence of a pivot angle control system. Without the uninterruptible power supply, the adjustment piston, if it is transferred to its default position or is then arranged there, would be moved out of its zero position (i.e. zero % pivot angle) or e.g. only moved relatively slowly and inaccurately in the direction of zero position via a spring. As a result of the further supply of power, the motor of the pump is not (initially) shifted in a torque-free manner, but rather actively decelerated to zero rpm. In particular, a decelerating resistor is used in order to decelerate the motor.

In particular, as a result of the provision of an uninterruptible power supply, no shut-off valves are required on the hydraulic cylinder. In addition, no pressure losses are produced by these otherwise existing additional shut-off valves. Further, the chambers of the hydraulic cylinder are not shut off (through the shut-off valves), which may be undesirable. Also, between (otherwise available) shut-off valves and the pump, no pressure spikes may occur that otherwise can occur with suddenly activated shut-off valves. Of course, shut-off valves can be provided additionally, however, if necessary or helpful.

As a result of providing an uninterruptible power supply, the initially described special design of the pivot angle control system (with a second valve and a second piston) s also not necessary.

In particular, the following events can be solved by the described hydraulic cylinder assembly or method as follows:

Event A: Emergency Stop

An emergency stop switch is actuated, i.e. the power supply is interrupted. The motor of the hydraulic cylinder assembly is decelerated to zero RPM as quickly as possible. The pivot angle of the pump is controlled down to 0% as quickly as possible. As a result of these measures, the hydraulic cylinder comes to a standstill (as quickly as possible). If applicable, after a waiting period has elapsed (in particular less than one second), the motor is shifted in a torque-free manner (STO).

Event B: Fault

A fault exists in the hydraulic cylinder assembly (e.g. a temperature of a component is too high). The motor of the hydraulic cylinder assembly is decelerated to zero RPM as quickly as possible. The pivot angle of the pump is controlled down to 0% as quickly as possible. As a result of these measures, the hydraulic cylinder comes to a standstill (as quickly as possible).

Event C: Power Failure

The power supply to the hydraulic cylinder assembly fails. The control unit of the hydraulic cylinder assembly (i.e. for example a converter, the valve of the pivot angle control system, a pivot angle travel transducer located on the adjustment piston and/or pump) continues to receive power or electrical energy from the uninterruptible power supply (UPS) or a UPS module. The pressure supply for the pivot angle control valve can still be supplied with electrical power and maintained accordingly. Alternatively, the pressure supply can be designed so as to provide sufficient pressure and flow rate for a certain period of time (e.g. the pressure supply can come from a reservoir for the pressure medium that is gradually relieved through a nozzle). The motor of the hydraulic cylinder assembly is decelerated to zero RPM as quickly as possible. The pivot angle of the pump is controlled down to 0% as quickly as possible. As a result of these measures, the hydraulic cylinder comes to a standstill (as quickly as possible). Only when the uninterruptible power supply no longer supplies electrical energy or current is the complete hydraulic cylinder assembly then de-energized.

Depending on the design of the hydraulic cylinder assembly, a PLC (a generally known programmable logic control unit) can still be powered via the UPS and, additionally, depending on the system design, the control of the pivot angle control valve can be housed in an external electronics unit, which is also powered via the UPS.

Alternatively, the UPS described here can also be designed as an additional 24V power supply that is powered from the described DC link. Both power supplies lead to an additional redundancy module. As long as the DC link is still charged, 24V [volt] is also present.

The use of indefinite articles ("a", "an"), in particular in the claims and the description that reproduces them, is to be understood as such and not as a numerical value. Accordingly, terms or components introduced in this way should be understood to be present at least once and can also be present multiple times.

As a precautionary measure, it should be noted that the numerical words ("first", "second", . . . ) used here primarily serve (only) to distinguish between a plurality of similar objects, quantities, or processes, and do not necessarily specify any dependency and/or order of these objects, quantities, or processes in relation to one another. If a dependency and/or order is required, this is explicitly stated here, or it is obvious to the person skilled in the art when studying the specifically described configuration. If a component can occur multiple times ("at least one"), the description of one of these components can apply equally to all or part of the majority of these components, but this is not mandatory.

BRIEF DESCRIPTION OF THE DRAWINGS

The disclosure as well as the technical environment will now be explained in greater detail with reference to figures, without these statements limiting the disclosure itself. To the extent that it is not explicitly excluded below, partial aspects or individual features shown in the figures can also be combined with one another and/or with the features of the claims or the preceding description. To the extent that components in different figures are provided with the same reference numeral, their descriptions apply mutatis mutandis to all of these components, unless otherwise explicitly stated. The figures schematically show:

DETAILED DESCRIPTION

Figure 1:
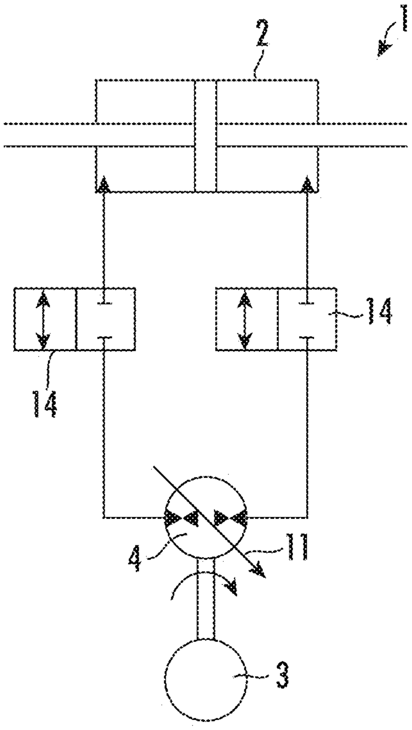
FIG. 1 (PRIOR ART)
FIG. 1 a first design variant of a hydraulic cylinder assembly according to the prior art, FIG. 2 a second design variant of a hydraulic cylinder assembly according to the prior art, FIG. 3 a third design variant of a hydraulic cylinder assembly according to the prior art, FIG. 4 a fourth design variant of a hydraulic cylinder assembly according to the prior art, FIG. 5 a first design variant of a hydraulic cylinder assembly.

FIG. 1 shows a first design variant of a hydraulic cylinder assembly 1 according to the prior art.

The hydraulic cylinder assembly 1 comprises a hydraulic cylinder 2, an adjustable pump 4 driven by a motor 3, and two shut-off valves 14. Thus, after a shutdown of the hydraulic cylinder assembly 1, a (residual) movement of the piston of the hydraulic cylinder 2 can be prevented. By means of the shut-off valves 14, a hydraulic connection between the two chambers of the hydraulic cylinder 2 and the pump 4 is interrupted. The motor 3 provided in order to drive the pump 4 is shifted free of torque.

Figure 2:
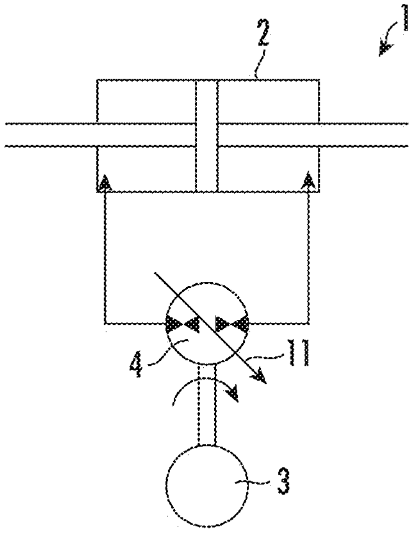
FIG. 2 (PRIOR ART)

FIG. 2 shows a second design variant of a hydraulic cylinder assembly 1 according to the prior art. Reference is made to the statements regarding FIG. 1.

By contrast to the first design variant, no shut-off valves 14 are provided here, so that the piston of the hydraulic cylinder 2 is moved further as the medium is conveyed by the pump 4. A simple triggering of an STO on the motor 3 will only result in a stoppage of the pump 4 when the kinetic energy of the motor 3 and the pump 4 is dissipated (provided no external hydraulic forces are acting on the pump 4). The pump 4 conveys according to its direction of rotation and, if applicable, its pivot angle 11.

Figure 3:
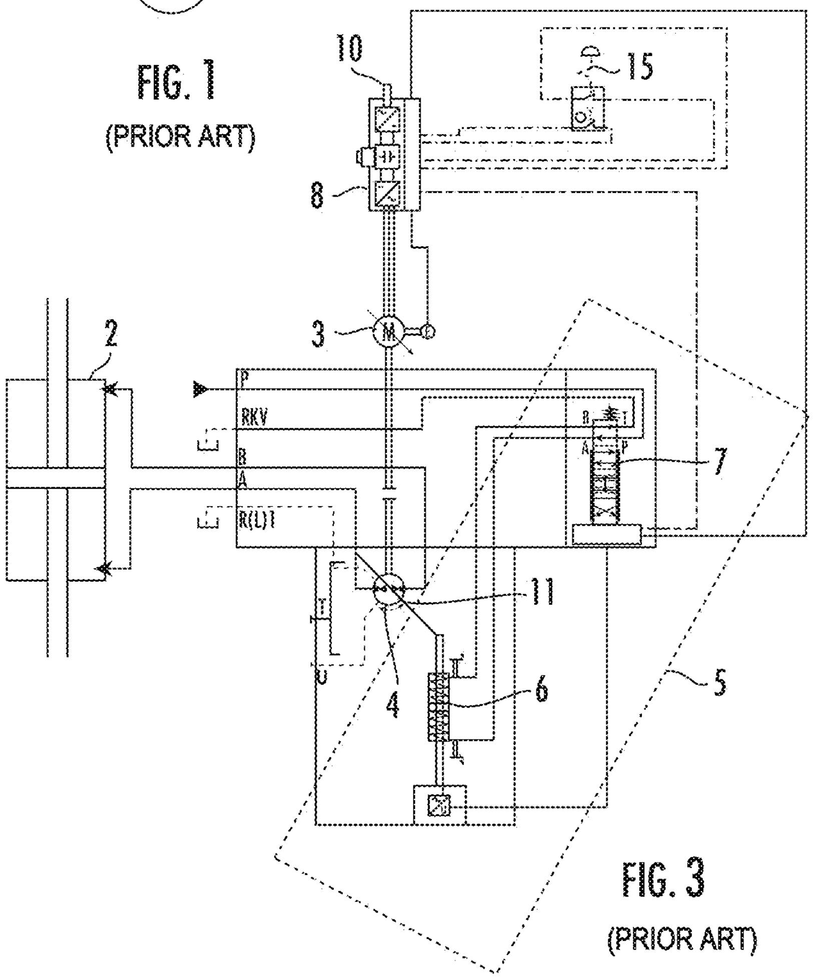
FIG. 3 (PRIOR ART)

FIG. 3 shows a third design variant of a hydraulic cylinder assembly 1 according to the prior art. Reference is made to the statements regarding FIG. 2.

This hydraulic cylinder assembly 1 comprises a pivot angle control system 5. The hydraulic cylinder assembly 1 comprises a hydraulic cylinder 1 (with a piston), a motor 3 for driving an adjustable pump 4, the pump 4, and a pivot angle control system 5 for the pump 4, wherein the pivot angle control system 5 comprises at least one adjustment piston 6 for pump 4 displacement and an electrically controllable valve 7 for controlling the adjustment piston 6. At least one direction of conveyance or pivot angle 11 of the pump 4 and thus a movement of the hydraulic cylinder 2 or the piston is controllable via the pivot angle control system 5. The pump 4 is adjustable through the pivot control system 5 between −100% (maximum discharge rate of the pump 4 in a first direction), 0% (no delivery of a medium through the pump 4), and +100% (maximum discharge rate of the pump 4 in a second direction).

If the (pivot angle control) valve 7 is switched to its de-energized default position analogously to the STO of the motor 3, then the resulting pivot angle 11 of the pump 4, and thus whether and in which direction the pump 4 conveys, depends on the default position of the valve, the valve pressure supply, and the presence of springs in the pivot cradle.

In a so-called A4 HS5 pump with connected control pressure (pressure port 12) and de-energized proportional valve or HS5 control valve (as the valve 7, i.e. a 4/4 way valve), for example, the minimum displacement of the pump 4 is the default position shown here. One chamber of the adjustment piston 6 is connected to the pressure port 12 and the other chamber of the adjustment piston 6 is connected to the return flow 13. This default position is also achieved when the HS5 control valve 7 is de-energized due to a fault (e.g. cable break, etc.). By contrast to an open circuit in which the pump 4 pivots to a minimum limit stop (zero % discharge), the pump 4 pivots beyond the zero position in the closed circuit to −100% discharge (direction reversal). In this case, the hydraulic cylinder 2 connected to the pump 4 accelerates in a maximum direction of movement. By implementing a zero-pivot function (see FIG. 4) into the known HS5 (E) control system, this behavior can be prevented.

Figure 4:
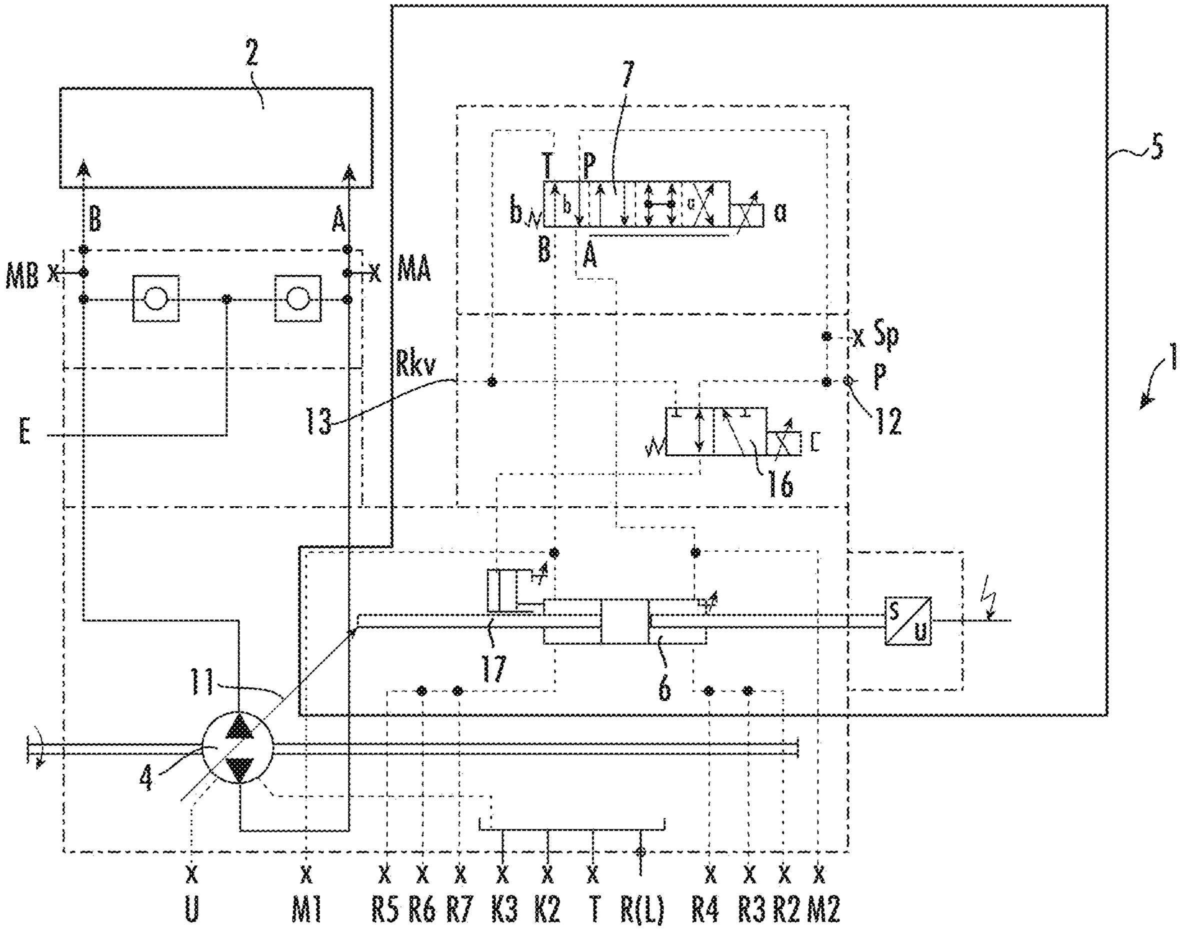
FIG. 4 (PRIOR ART)

In order to enable the pump 4 to be pivoted to a pivoting angle 11 of zero % with a de-energized pivot angle control valve 7 in case of, for example, pumps 4 with this kind of unfavorable default position of the pivot angle control valve (valve 7), an additional (second) valve 16 and an additional (second) piston 17 or cylinder can be provided (see FIG. 4).

FIG. 4 shows a fourth design variant of a hydraulic cylinder assembly 1 according to the prior art. Reference is made to the statements regarding FIG. 3.

By contrast to the third design variant, a second valve 16 and a second piston 17 are provided in this hydraulic cylinder assembly 1.

In normal operation of the hydraulic cylinder assembly 1, the electrically actuated 4/4-way valve 7 controls the pressure ratios in the adjustment piston 6 as the (first) valve and thus pivots the pump 4. The first valve 7 is thus loaded with current and unloads the second piston 17, which is thus ineffective/powerless. In the event of a fault of the (first) valve 7, the valve moves to the shown default position in which the one (first) chamber of the adjustment piston 6 is connected to the return flow 13 and is thus unloaded. The other (second) chamber of the adjustment piston 6 is connected to the pressure port 12 and thus to the adjustment pressure. This causes the adjustment piston 6 to be moved towards the first chamber. In order to prevent the end position of the adjustment piston 6 (in which a maximum conveying quantity of the pump 4 is set), the second valve 16 is deactivated and connects the second piston 17 or cylinder with the pressure port 12. As a result, the second piston 17 extends to an adjustable limit stop (which corresponds to the center position, i.e. the zero % position of the pump 4). The effective surface of the second piston 17 is larger than the effective surface of the adjustment piston 6, so that it is ensured that the end position of the second piston 17 or cylinder is achieved, which in turn corresponds to the center position, i.e. the zero % position of the pump 4.

However, the second piston 17 and second valve 16 are required in order to implement this hydraulic cylinder assembly 1.

Figure 5:
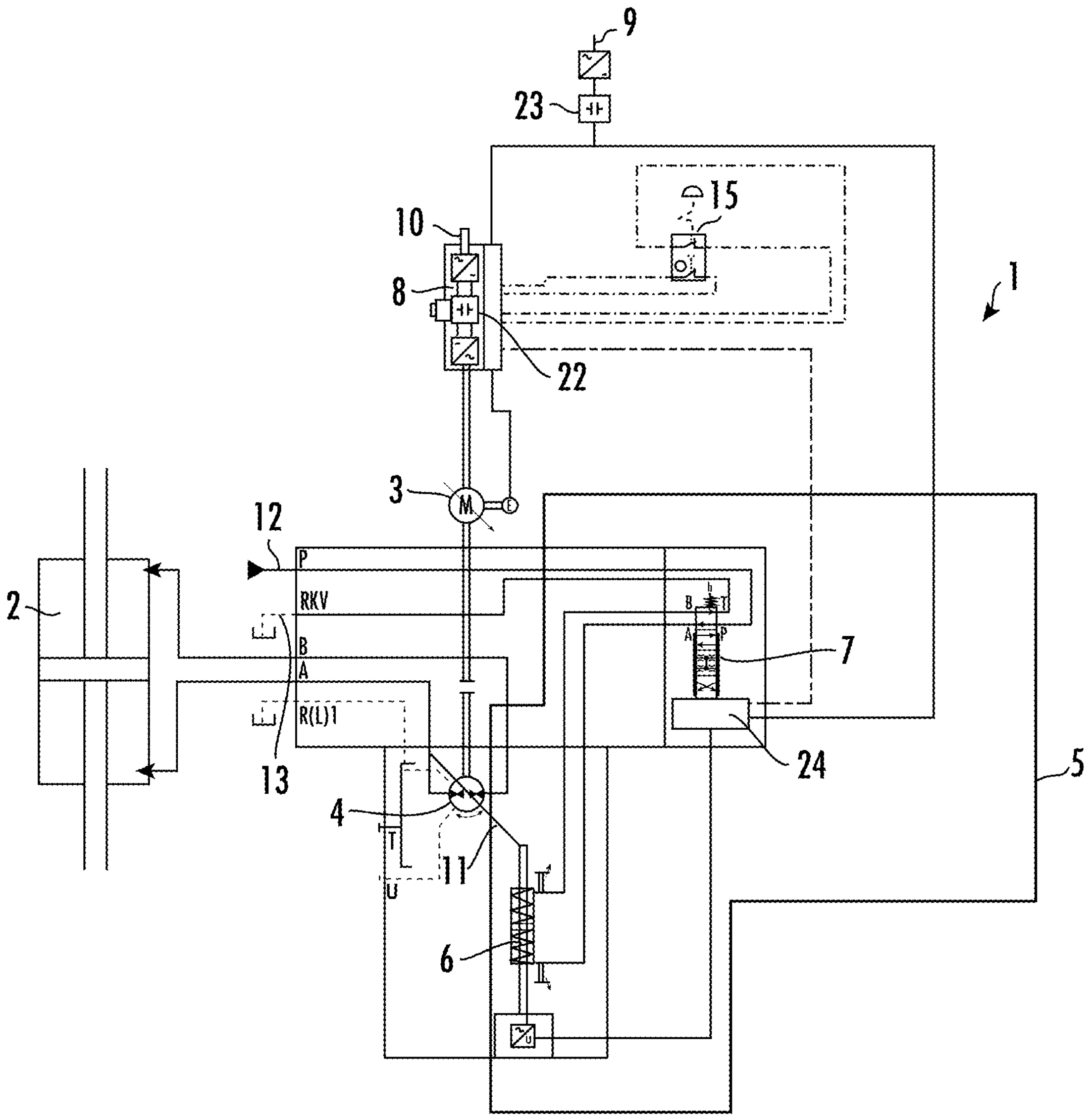

FIG. 5 shows a first design variant of a hydraulic cylinder assembly 1. Reference is made to the statements regarding FIGS. 1-4.

The hydraulic cylinder assembly 1 comprises a hydraulic cylinder 2, a motor 3 for driving an adjustable pump 4, the pump 4, and a pivot angle control system 5 for the pump 4, wherein the pivot angle control system 5 comprises at least one adjustment piston 6 for pump 4 displacement and an electrically controllable valve 7 for controlling the adjustment piston 6. At least one direction of conveyance or pivot angle 11 of the pump 4 (between −100% and +100% conveying quantity) and thus a movement of the hydraulic cylinder 2 is controllable via the pivot angle control system 5. The hydraulic cylinder assembly 1 comprises an electrical control unit 8 for operating at least the motor 3 and the valve 7.

The hydraulic cylinder assembly 1 further comprises an uninterruptible power supply 9, such that in the event of a failure of a power supply 10 for the control unit 8, e.g. by actuating the emergency stop switch 15, at least the control unit 8 can be supplied with electrical power from the uninterruptible power supply 9.

In the event of a failure of the power supply 10 for the control unit 8, the valve 7 can be controlled via the power supplied by the uninterruptible power supply 9 so that a pivot angle 11 of the pump 4 can be adjusted to zero % via the adjustment piston 6.

In the event of a failure of the power supply 10 for the control unit 8, the motor 3 can also be decelerated to zero rpm via the energy supplied by the uninterruptible power supply 9 through a decelerating resistor 22.

In particular, the uninterruptible power supply 9 comprises a capacitor 23 or a DC link connected to the power supply 10, wherein the capacitor 23 or the DC link provides the power for supplying at least the control unit 8 in the event of a failure of the power supply 10.

The uninterruptible power supply 9 can thus ensure that the hydraulic cylinder 1 reaches a stop (the pump 4 no longer conveys or is in the zero % position and the motor 3 no longer drives the pump 4).

The method for operating the hydraulic cylinder assembly 1 comprises, in the event of failure of the power supply 10 according to step a), supplying electrical power to at least the control unit 8 from the uninterruptible power supply 9. According to step b), the motor 3 is decelerated to zero rpm using energy supplied by the uninterruptible power supply 9, and the valve 7 is actuated using energy supplied by the uninterruptible power supply, so that a pivot angle 11 of the pump 4 is adjusted to zero % via the adjustment piston 6.

Steps a) and b) are carried out together, meaning that only the electrical energy from the uninterruptible power supply 9 is used in order to slow down the motor 3 and actuate the valve 7 and thus the adjustment piston 6.

Without the actuation of the valve 7, the valve 7 would otherwise move to the shown default position, in which the adjustment piston 6 is transferred to one of the end positions, so that the pump 4 would then be adjusted to −100% or +100% pivot angle 11 and the hydraulic cylinder 1 would continue to move.

As part of step b), the energy supplied by the uninterruptible power supply 9 is completely consumed. The hydraulic cylinder assembly 1 is therefore de-energized after step b), i.e. there is no more electrical energy in the hydraulic cylinder assembly 1 (i.e. in the control unit 8, the uninterruptible power supply 9, or other components).

Figure 6:
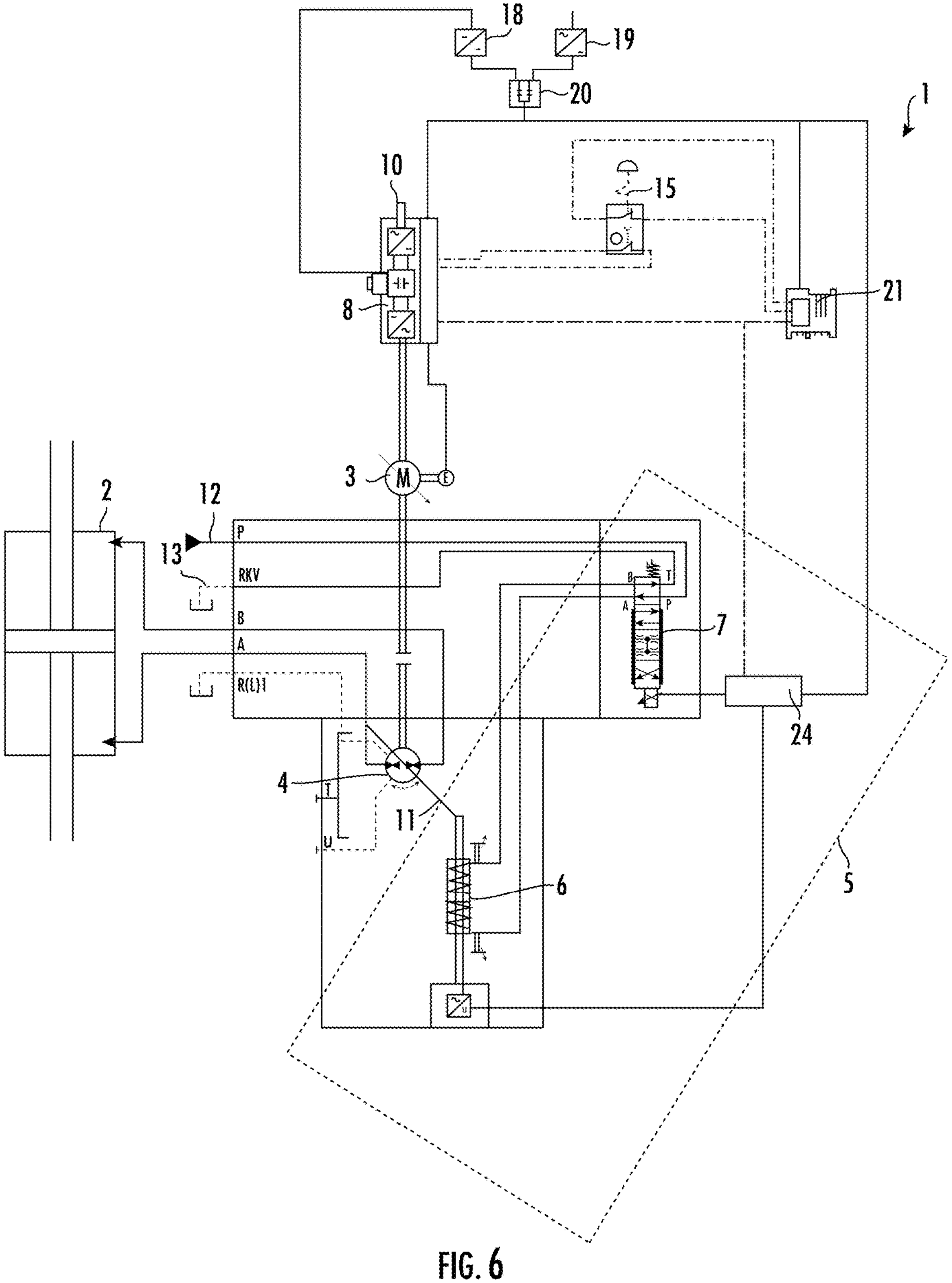
FIG. 6 a second design variant of a hydraulic cylinder assembly.

FIG. 6 shows a second design variant of a hydraulic cylinder assembly 1. Reference is made to the explanations regarding FIG. 5.

By contrast to the first design variant shown in FIG. 5, FIG. 6 shows a hydraulic cylinder assembly 1 having a differently designed uninterruptible power supply 9. The uninterruptible power supply 9 is designed as an additional 24V power supply 19, which is supplied from the DC link 18. Both power supplies 19 (power supply 19 and power supply of the DC link 18) lead to an additional redundancy module 20. As long as the DC link 18 is still charged, 24V is also present.

In addition, in FIG. 6, a PLC 21 is still powered via the uninterruptible power supply 9. The control of the (pivot angle control) valve 7 is housed in an external electronics 24, which is also powered via the uninterruptible power supply 9.

The invention claimed is:

1. A hydraulic cylinder assembly comprising:
- a hydraulic cylinder;
- an adjustable pump;
- a motor configured to drive the adjustable pump;
- a pivot angle control system configured to adjust at least one conveying direction of the adjustable pump and thus a movement of the hydraulic cylinder, the pivot angle control system comprising:
  - at least one adjustment piston configured to adjust the adjustable pump; and
  - an electrically controllable valve configured to control the at least one adjustment piston;
- an electrical control unit configured to operate at least the motor and the valve; and
- an uninterruptible power supply configured to, when a power supply for the control unit fails, supply at least the control unit with electrical power,
- wherein the hydraulic cylinder assembly is configured such that, when the power supply for the control unit fails, the motor is decelerated to zero RPM via the power supplied by the uninterruptible power supply, and
- wherein the hydraulic cylinder assembly is configured such that the power supplied by the uninterruptible power supply is consumed entirely during the decelerating of the motor.

2. The hydraulic cylinder assembly according to claim 1, wherein the hydraulic cylinder assembly is configured such that, when the power supply for the control unit fails, at least the valve is controllable via the power supplied by the uninterruptible power supply in such a way that a pivot angle of the adjustable pump is adjusted to zero percent via the at least one adjustment piston.

3. The hydraulic cylinder assembly according to claim 1, wherein the uninterruptible power supply comprises a capacitor or a DC link connected to the power supply for the control unit, and the capacitor or the DC link provides the power for supplying at least the control unit when the power supply for the control unit fails.

4. The hydraulic cylinder assembly of claim 1, further comprising a deceleration resistor that is connected by said control unit between said uninterruptible power supply and said motor to decelerate the motor to zero RPM.

5. A method for operating a hydraulic cylinder assembly, the hydraulic cylinder assembly including (i) a hydraulic cylinder, (ii) an adjustable pump, (iii) a motor configured to drive the adjustable pump, (iv) a pivot angle control system configured to adjust at least one conveying direction of the adjustable pump and thus a movement of the hydraulic cylinder, the pivot angle control system having at least one adjustment piston configured to adjust the adjustable pump and an electrically controllable valve configured to control the at least one adjustment piston, (v) an electrical control unit configured to operate at least the motor and the valve, and (vi) an uninterruptible power supply, the method comprising:
- when a power supply for the control unit fails:
  - supplying at least the control unit with electrical power from the uninterruptible power supply;
  - decelerating the motor to zero rpm using energy supplied by the uninterruptible power supply, and
  - entirely consuming the power supplied by the uninterruptible power supply during the decelerating of the motor.

6. The hydraulic cylinder assembly of claim 5, wherein the step of decelerating the motor includes directing energy supplied by the uninterruptible power supply through a deceleration resistor to said motor.

* * * * *